Dec. 31, 1957  M. J. PARKER  2,818,463
BATTERY ADAPTER
Filed April 11, 1956

*INVENTOR.*
MARTIN J. PARKER
BY
PARKER & CARTER
ATTORNEYS

United States Patent Office 2,818,463
Patented Dec. 31, 1957

2,818,463

BATTERY ADAPTER

Martin J. Parker, Milwaukee, Wis., assignor to Iwan Ries & Co., Chicago, Ill., a corporation of Illinois Application April 11, 1956, Serial No. 577,492

6 Claims. (Cl. 136—173)

This invention relates to a battery adapter and has for one object to provide a battery adapter or supporting means so arranged that it can be readily used with small devices such as the so-called cigarette lighters now in common use. It has for another object to provide a battery adapter or holder so arranged that batteries of conventional type, but of suitable size, may be used readily for original equipment and for replacement.

Another object is to provide an adapter of the type generally indicated which will permit the use of inexpensive batteries as a means for actuating devices, particularly of small size, among them cigarette lighters.

Other objects will appear from time to time throughout the specification and claims.

The invention is illustrated more or less diagrammatically in the accompanying drawings wherein.

Like parts are designated by like characters throughout the specification and drawings.

Figure 1:
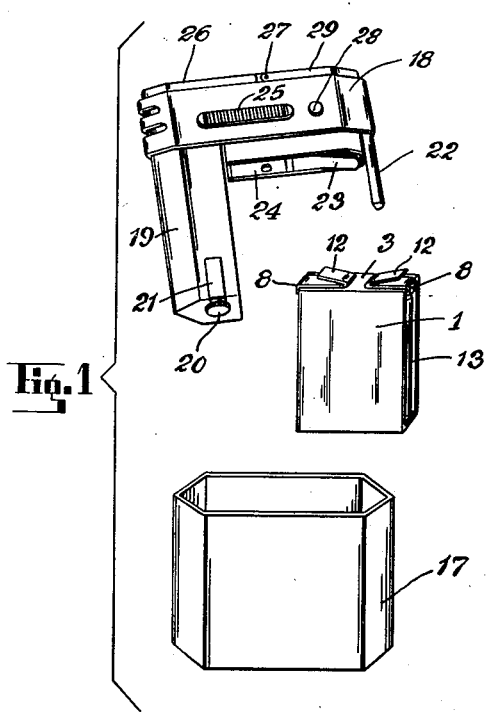
Fig. 1 is an exploded view in perspective showing the adapter and a cigarette lighter with which it may be used.

The adapter comprises generally a light, compact container made wholly or largely of electrically insulating material and provided with the necessary contact and conducting members to permit a plurality of individual so-called dry batteries to be readily positioned and retained in it. Thereafter the adapter and the dry batteries may be handled as a unit and may be put in place in and removed from a point of use whenever necessary.

The adapter or battery container comprises a pair of side walls 1, 1, the bottom wall 2 and a top wall 3. A partition 4 is positioned within the space enclosed by the members thus far described and in effect divides the space enclosed within the adapter into two chambers or compartments of substantially equal size. The partition 4 may stop short of the bottom wall 2 and if it does, a clearance 5 will remain. This clearance 5 may be only sufficient to permit a conductive member 6 to be put in place beneath it. The conductive member 6 extends sufficiently into each half of the space enclosed within the adapter to make proper electrical contact with each of the two batteries. It is preferably cemented or otherwise permanently fixed in place.

The adapter may conveniently be made of plastic material such as any of the main electrically insulating plastic materials now readily available. It is sufficient for the purposes of the invention that the material be electrically insulating and that it be of such strength as is necessary to retain the parts which are associated with it in proper position. It may be molded or otherwise formed as a unit, or it may be made of separate parts cemented, fused or otherwise fastened together. The invention is, therefore, not limited to any particular material nor to any particular method for securing the parts together to produce the adapter generally as shown in the drawings.

Figure 2:
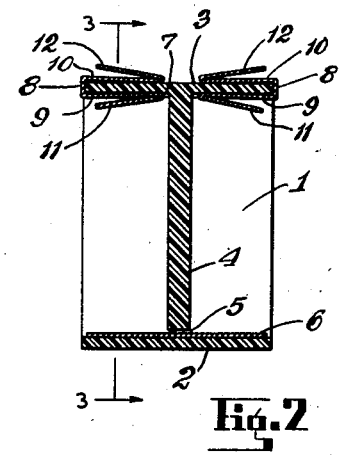
Fig. 2 is a view on an enlarged scale in vertical section showing the adapter with batteries removed.
Figure 3:
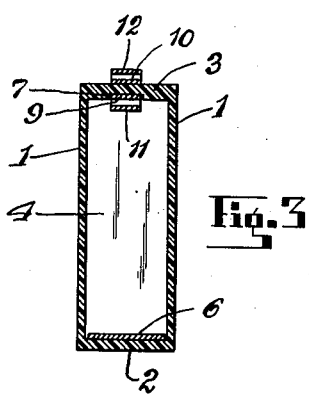
Fig. 3 is a transverse vertical section taken at line 3—3 of Fig. 2.

The top wall 3 may have formed in its inner surface, as shown in Fig. 3 in particular, a pair of grooves 7. The grooves, if they are present, position the upper contact members 8 in place. These contact members 8, as shown separately in Fig. 5 and in position of Figs. 2 and 4 in particular, are formed of electrically conductive material and may be conveniently made of metal, brass, copper or bronze. Each is shaped to fit over a portion of the upper wall 3. If the groove 7 is present, a portion of each contact member 8 is engaged within the groove. The contact members 8 may be symmetrical, as shown, and in that case each includes a pair of longitudinally extending parts 9 and 10 which will generally be in contact with a part of the top wall 3 of the adapter. The longitudinal member 9 will lie in one of the grooves 7. The longitudinal part 10 will lie in contact with the top or outer surface of the top wall 3. Each of the contact members 8 is provided also with a battery-contacting part 11 and a housing-contacting part 12. The battery-contacting part 11 lies within the adapter and is in contact as shown with one or the other of the batteries 13 and 14. The batteries are put in reverse position so that they are connected in series. Since that is the arrangement preferred, the contact point 15 of the battery 13 is in electrical contact with the member 6 and the bottom of the battery shell of the member 13 is in contact with the portion 11 of one of the contact members 8. Correspondingly, the bottom of the battery shell of the battery 14 is in contact with the member 6 and the portion 16 of the battery 14 is in contact with the member 11 of the left-hand contact member 8 as shown in Fig. 4.

Figure 4:
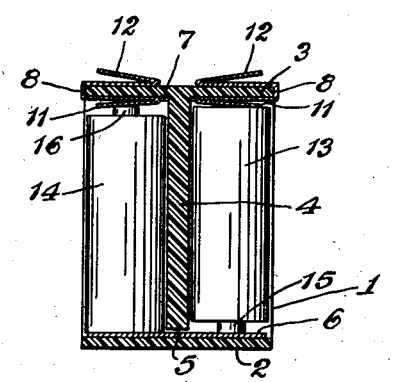
Fig. 4 is a vertical section generally similar to Fig. 2 but showing the batteries and contact members in place.
Figure 5:
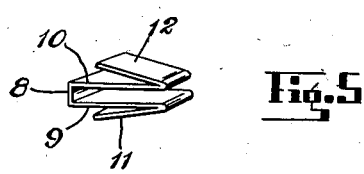
Fig. 5 is a perspective view illustrating one of the contact members removed from the adapter.

The dimensions of the parts and the compression of the contact members 11, which are biased to compress the batteries, are such that when the batteries have been put into place, as shown in Fig. 4, they are retained and thereafter the adapter with the batteries in place may be handled and treated as a unit just as though it were a single battery.

One suitable use to which the device of this invention may be put is illustrated in the exploded view of Fig. 1. The adapter with the batteries in place is indicated midway between a cigarette lighter housing and its mechanism. The housing 17 of the lighter is normally made of metal, although not necessarily so, and is of whatever size and shape as desired. It will have a closed bottom and an open top. The lighter mechanism is largely enclosed in an upper housing section 18. The details of the lighter mechanism are not shown as they form no essential part of the invention. It is sufficient for the purposes of the invention that there is present a member which is used to ignite the wick or other part of the lighter which will be used by the user to light a cigar or cigarette. For this purpose, if a wick is used fuel will normally be used also and will be contained in a tank member 19 which has an opening in its bottom closed by a filler plug 20. Normally spring members 21 will be positioned on each side of the tank 19 and will be of such size and shape that they contact the inner face of the housing 17 and hold the tank 19 against rattling or looseness. A guiding and spacing member 22 may be fixed at the opposite end of the housing 18. The spacing of the members 19 and 22 is such that they guide the housing 19 into place and prevent misplacement when the lighter mechanism is moved into engagement and final position in the housing 19. Ordinarily the dimensions of the housing 17 of the adapter, and the tank 19 and the member 22 are such that they all fit freely together when they are all put inside of the housing 17.

The electrical means present in the lighter, by means of which cigars and cigarettes may be lighted, is not shown as the invention is not limited to any particular form of such means. Whatever the means may be in the lighter they are actuated by the battery or batteries contained in the adapter. To accomplish that purpose contact members 23 and 24 are positioned beneath the member 18. They are separate from each other and are connected to the igniting means and thus when the parts are in position so that the contacts 12 of the adapter are in contact with the members 23 and 24 of the lighter mechanism, the circuit may be completed to actuate the lighting member so that it may be used to light cigars or cigarettes. A switch-operating member 25 is slidably positioned on the housing 18. In one position it completes the circuit so that the lighter may be used. In another position it breaks the circuit so that the igniting means is not energized and the lighter is inactive. A cover 26 may be hinged at 27. Normally it will be closed, but may be open by the operation of the switch-sliding member 25 or otherwise.

When the parts are assembled, the member 18 which contains the lighter-actuating mechanism and is in effect a housing for that mechanism, preferably overlaps the upper edge of the housing 17 so that all of the parts are contained in an enclosure formed by the members 17 and 18. If desired, the parts may be so made that the member 18 merely abuts against the upper edge of the member 17 without any overlapping or interfitting of these two parts. The parts are so dimensioned that they have sufficiently tight friction fit so that having been pushed into place they will remain properly assembled and engaged until deliberately separated.

The invention is, of course, not limited to use in a lighter. It may equally well be used for a flashlight or for combined flashlight and lighter. The housing 18 includes, in addition to the light mechanism, a flashlight, which comprises a small light bulb. The circuit to the bulb is completed by pressing the switch button 28 and the light, which is not shown, shines through a suitable opening in the fixed top portion 29 in the housing. Obviously the adapter with the batteries shown might be used to actuate a lighter without any flashlight mechanism. It might be used to operate a flashlight without a lighter mechanism, or, as shown in illustration herewith, it might be used to operate the two. Normally, of course, if both are present in a single housing they will not be operated at the same time.

The invention is shown as applied to the combined flashlight and lighter merely to illustrate one suitable use and to illustrate the fact that the invention is not limited to use in any particular association. Similarly, although the housing 17 and other parts of the lighter mechanism may be formed of metal, they may be made of other material and the adapter, although it will normally be made of entirely electrically insulating material—for example a suitable plastic, may be made of any desired material so long as proper provision is made to prevent short-circuiting of the battery or batteries present within the adapter.

Although an operative form of the device has been shown, the invention is not limited to the particular details shown. Many changes may be made in the form, shape and arrangement of parts without departing from the spirit of the invention.

The use, operation and function of the invention are as follows:

With the adapter made as shown in Fig. 2 batteries are inserted as shown in Fig. 4. The invention might be embodied in an adapter which would accept only one battery or cell or it might be embodied in an adapter which would accept more than two batteries or cells. For many purposes a convenient assembly is made by an adapter and two individual dry cells. This will furnish adequate power for many purposes. Whatever the number of cells, they will be pushed into the adapter and held in place by the contact members or by friction of the cells and the adapter, or otherwise, so that the cells may be conveniently put into the adapter with relatively little effort and will be retained there as long as needed but can be withdrawn therefrom with relatively little effort. When the cells are in place, as shown in Fig. 4, the device constitutes a unit which is moved as a unit and which, as shown in Fig. 1, may be readily put into the housing 17. When the mechanism carried by the upper housing member 18 is assembled so that it engages the housing 17, the parts will all fit together, will enclose the complete battery and adapter, and the parts will be in electrical circuit ready for use upon the actuation of the switch members 25 or 28.

When a battery is finally exhausted, the lighter members are separated and the adapter may be removed. Then the cells or batteries are withdrawn from the adapter and new fresh ones are installed in the adapter and the parts are then reassembled, the adapter as a unit being moved into the housing 17 in suitable position to permit the insertion of the parts 19 and 22.

Thus the adapter shown complete in Fig. 2 without batteries or cells comprises a ready means for use either as original equipment or as a replacement, whereby dry cells of standard or conventional design may be used and replaced whenever desired. Other types of batteries may be used in the lighter shown and if any other such types are used as original equipment, they may be replaced by the adapter and battery system shown in Fig. 4. In that case, of course, the device of Fig. 4 serves merely as replacement equipment for whatever other type of battery was previously present.

The device of this invention and its use and operation have been described in detail in connection with a cigar or cigarette lighter. Although this is one use to which the device may be put and for that reason the device has been described in detail in connection with that use, it is not limited to that or to any other particular use. The adapter of this invention may be used in any situation in which it is desired to supply electric current within the capacity of the cells and within the dimensions in which the cells and the adapter may conveniently be provided. The invention is not limited, therefore, to any particular use nor to any particular dimensions. It is adapted for use to actuate toys, bells, timing devices and other mechanisms of many types. The particular description of the device therefore, as used in connection with a lighter, is not to be taken as limiting the device to that use or combination. Generally when the adapter of this invention is used in connection with any device, the device will have contacts which may be considered the general equivalent of the contacts 23 and 24 of Fig. 1. This is the preferred arrangement because the adapter, comprising as it does the contact members 12—12, can most conveniently and expeditiously be applied to a device for which it is to furnish electrical current if that device is already provided with contacts which may conveniently be engaged by the contacts 12—12 of the adapter.

I claim:

1. In combination a battery adapter comprising side wall members, top and bottom wall members and an intermediate partition member shaped to provide with said wall members open-sided compartments, an electrically conductive member positioned at one end of each compartment and extending past said partition, and a plurality of contact members positioned one in each of said compartments, each said contact member extending about an edge of said top and positioned opposite said first-mentioned contact member and each comprising contact parts within and without its respective compartment, and a plurality of dry cells positioned one in each of said compartments and in contact with said contact members and arranged in series.

2. In combination a battery adapter comprising side wall members, top and bottom wall members and an intermediate partition member shorter than said wall members and shaped to provide with said wall members oppositely facing open-sided compartments, an electrically conductive member positioned at one end of each compartment and extending past said partition, a plurality of contact members, each said contact member extending about an edge of said top and positioned one in each of said compartments opposite said first-mentioned contact member and each comprising spring-contact parts within and without its respective compartment, and a plurality of dry cells positioned one in each of said compartments and in contact with said contact members and arranged in series.

3. A unitary, electrically insulated battery adapter including a body defining two open-sided compartments positioned side by side, a partition integral with the body and raised above the bottom of the compartments, a top part over each compartment and an electrical contact member receiving groove in each said top part and within each compartment, an electrical contact member extending into each compartment under the raised partition, and a spring contact electrically conductive member for each compartment, each said member including a portion engaging the top of its respective compartment, fitting over the open edge of the top part and extending into said groove, each said member having spring contact portions extending upwardly from the top part and downwardly within said compartment, each said spring contact portion being yieldable toward and away from said top part.

4. The structure of claim 3 characterized in that said body is formed from an insulating plastic material.

5. A unitary, electrically insulated battery adapter including a body defining two open-sided compartments positioned side by side, a partition integral with the body and raised above the bottom of the compartments, a top part over each compartment, an electrical contact member extending into each compartment under the raised partition, and a spring contact electrically conductive member for each compartment, each said member including a portion engaging the top of its respective compartment, fitting over the open edge of the top part, each said member having spring contact portions extending upwardly from the top part and downwardly within said compartment, each said spring contact portion being yieldable toward and away from said top part.

6. The structure of claim 5 characterized in that said body is formed from an insulating plastic material.

References Cited in the file of this patent

UNITED STATES PATENTS

| | | |
|---|---|---|
| 1,858,026 | Schulte et al. | May 10, 1932 |
| 2,590,804 | Vitale | Mar. 25, 1952 |